(12) United States Patent
Feldhaus et al.

(10) Patent No.: US 10,241,209 B2
(45) Date of Patent: Mar. 26, 2019

(54) ARRANGEMENT AND METHOD FOR POSITION FINDING USING A HANDSET

(71) Applicant: Deere & Company, Moline, IL (US)

(72) Inventors: Johannes Feldhaus, Königswinter (DE); Marcus Reutemann, Edingen-Neckarhausen (DE)

(73) Assignee: DEERE & COMPANY, Moline, IL (US)

( * ) Notice: Subject to any disclaimer, the term of this patent is extended or adjusted under 35 U.S.C. 154(b) by 651 days.

(21) Appl. No.: 14/200,299

(22) Filed: Mar. 7, 2014

(65) Prior Publication Data
US 2014/0292567 A1 Oct. 2, 2014

(30) Foreign Application Priority Data

Mar. 27, 2013 (DE) .......................... 10 2013 205 486

(51) Int. Cl.
G01S 19/03 (2010.01)
G01S 19/07 (2010.01)
(Continued)

(52) U.S. Cl.
CPC .............. *G01S 19/03* (2013.01); *G01S 19/07* (2013.01); *G01S 19/41* (2013.01); *G01S 19/32* (2013.01); *G01S 19/33* (2013.01)

(58) Field of Classification Search
CPC .......... G01S 19/03; G01S 19/07; G01S 19/41; G01S 19/32; G01S 19/33; G01S 5/0018;
(Continued)

(56) References Cited

U.S. PATENT DOCUMENTS 5,365,447 A * 11/1994 Dennis ...................... G01S 5/14
342/352
5,754,137 A * 5/1998 Durrstein ............. A01B 79/005
348/120
(Continued)

FOREIGN PATENT DOCUMENTS

DE 4342171 5/1994
DE 4342171 A1 5/1994
(Continued)

OTHER PUBLICATIONS

European Search Report issued in counterpart application No. 14155390.9, dated Dec. 1, 2014 (10 pages).
(Continued)

*Primary Examiner* — Bernarr E Gregory
*Assistant Examiner* — Nuzhat Pervin

(57) ABSTRACT

An arrangement for detecting the position of a handset comprises a vehicle having a positioning signal receiver for receiving signals of the satellites of a positioning system and an electronic processor. The processor generates a local correction signal to improve the accuracy of a position determined by the signals of a positioning signal receiver. A portable handset is equipped with a positioning signal receiver for receiving signals of the satellites of the positioning system and an electronic processor which, in operation, receives position signals from the positioning signal receiver of the handset, derives from these signals raw position data of the handset and uses these raw position data for determining the position of the handset. The raw position data of the handset are corrected by the local correction signal provided by the processor of the vehicle.

11 Claims, 3 Drawing Sheets

(51) Int. Cl.
*G01S 19/32* (2010.01)
*G01S 19/33* (2010.01)
*G01S 19/41* (2010.01)

(58) Field of Classification Search
CPC ......... G01S 5/0072; G01C 15/00; G01C 3/00; B64G 1/1014; A01B 79/005; A01B 69/008
USPC ...................................................... 342/357.4
See application file for complete search history.

(56) References Cited

U.S. PATENT DOCUMENTS

| | | | | | |
|---|---|---|---|---|---|
| 5,990,825 | A * | 11/1999 | Ito | ............................ | G01S 5/009 342/357.31 |
| 6,067,046 | A * | 5/2000 | Nichols | .................. | G01C 15/00 342/357.31 |
| 6,182,927 | B1 * | 2/2001 | Galvin | ................. | B64G 1/1014 244/158.4 |
| 6,204,807 | B1 * | 3/2001 | Odagiri | ................... | G01S 19/34 342/357.57 |
| 6,529,160 | B2 * | 3/2003 | Jandrell | ................ | G01S 5/0018 342/357.64 |
| 6,774,841 | B2 * | 8/2004 | Jandrell | ................ | G01S 5/0018 342/357.64 |
| 6,865,465 | B2 * | 3/2005 | McClure | .............. | A01B 69/004 701/468 |
| 7,057,553 | B2 * | 6/2006 | Jandrell | ................ | G01S 5/0018 342/357.64 |
| 7,725,113 | B2 * | 5/2010 | Fiedelak | ................ | G01S 19/07 455/456.1 |
| 9,286,490 | B2 * | 3/2016 | Raghupathy | ........ | G06F 21/6245 |
| 2002/0072850 | A1 * | 6/2002 | McClure | .............. | A01B 69/008 701/25 |
| 2003/0016166 | A1 * | 1/2003 | Jandrell | ................ | G01S 5/0018 342/357.64 |
| 2007/0247361 | A1 * | 10/2007 | Shoarinejad | ............ | G01S 19/05 342/357.42 |
| 2010/0159952 | A1 * | 6/2010 | Hanson | .................. | G01S 19/07 455/456.2 |
| 2011/0071759 | A1 * | 3/2011 | Pande | .................. | G01C 21/165 701/469 |
| 2011/0096319 | A1 * | 4/2011 | Otani | ....................... | G01C 3/00 356/3.14 |
| 2011/0115915 | A1 * | 5/2011 | Velusamy | ............. | G01S 5/0009 348/158 |
| 2011/0207468 | A1 * | 8/2011 | Nakamura | ........ | H04W 52/0274 455/450 |
| 2011/0246025 | A1 * | 10/2011 | Ishihara | ................... | G08G 1/20 701/36 |
| 2011/0287779 | A1 * | 11/2011 | Harper | .................... | G01S 19/03 455/456.1 |
| 2012/0127032 | A1 * | 5/2012 | McClure | ................. | G01S 19/13 342/357.44 |
| 2012/0139782 | A1 * | 6/2012 | Gutt | ...................... | G01S 5/0072 342/357.24 |
| 2012/0237083 | A1 * | 9/2012 | Lange | ................ | G06K 9/00805 382/103 |
| 2013/0245858 | A1 * | 9/2013 | Yonehara | ................... | G05D 1/0016 701/2 |
| 2016/0035096 | A1 * | 2/2016 | Rudow | ................... | G01S 19/25 348/135 |

FOREIGN PATENT DOCUMENTS

| | | | |
|---|---|---|---|
| DE | 10054764 | 6/2001 | |
| DE | 112010000674 | 11/2012 | |
| RU | 2249179 C1 | 1/2005 | |
| RU | 2439497 C1 | 1/2012 | |
| WO | WO-2007027383 A2 * | 3/2007 | ............. G01S 19/04 |
| WO | 2007080473 A1 | 7/2007 | |
| WO | 2011106278 A2 | 9/2011 | |

OTHER PUBLICATIONS

Eurasian Search Report issued in counterpart application No. 201400223, dated Sep. 30, 2014 (4 pages).

P. Jurschik: Let a Computer onto the Field, Landtechnik Mar. 1998, p. 142-143, with English summary.

German Search Report in Counterpart German Application No. 14155390.9 (5 pages) (dated Aug. 5, 2014).

* cited by examiner

ARRANGEMENT AND METHOD FOR POSITION FINDING USING A HANDSET

RELATED APPLICATIONS

This application claims priority to German Application No. 102013205486.6 filed on Mar. 27, 2013 the disclosure of which is incorporated herein by reference.

FIELD OF INVENTION

The invention relates to an arrangement and a method for position finding using a handset.

BACKGROUND ART

In agriculture, there is a need for finding the position of the boundaries of a field or other points of the field such as, for example, positions at which ground samples have been taken or are to be taken or problems to be eliminated occur such as stones to be removed or faulty drainage, as accurately as possible. These position data are used for planning and late control of the agricultural processing events. In other operations, too, such as an elimination of damages at known positions or for automatically directing or delivery of seeds and fertilizers to specific places, there is a need for accurately detecting a position. Further applications are also found in the building trade and in surveying.

In the prior art, it has been proposed to obtain the field boundaries by driving around the field with a vehicle whilst simultaneously detecting the position of the vehicle by means of a satellite-based positioning system (e.g. GPS, Global Positioning System) (see Published German patent application DE 43 42 171 A1). In this procedure, the vehicle must be moved precisely on the field boundaries. If this is not possible, e.g. because there are fences there, a distance is input and the driver attempts to drive always at the input distance from the field boundary. In this context, errors can never be avoided completely.

Furthermore, the possibility exists of equipping an employee with a portable device with which he goes over a field in order to record geographically referenced data from the field (P. Jurschik: Let a computer onto the field, Landtechnik March 1998, p. 142-143). The portable device is designed as a notebook or so-called pen computer and connected to an external DGPS receiver and where the correction signals are transmitted by radio waves from stationary transmitters. The operator goes over the field with the device in order to detect site contours there, take soil samples or create ratings.

At present, portable handsets which can be held in a hand, in the form of so-called smartphones or tablets are already equipped with DGPS receivers as standard. They are provided with differential correction signals from stationary transmitting devices (Published German patent application DE 100 54 764 A1). Similar devices are also used in surveying (Published German patent application DE 11 2010 000 674 A1).

The satellite-based positioning systems such as GPS, Glonass or the future Galileo use a number of satellites located in an Earth orbit and equipped with atomic clocks which in each case radiate electromagnetic (radio) waves containing time and identity or location information. If they are provided with a precise (atomic) clock, the associated receivers must in each case receive the signals from at least three satellites in order to be able to determine their current position in space. If the receiver does not have a precise clock, reception of signals from four satellites is required. The accuracy of the positioning increases with the number of satellites received in each case.

The accuracy of the positioning system is usually improved by the reception of radio signals containing correction data which are radiated by reference stations at known locations. These systems are called differential positioning systems (e.g. DGPS). The reference stations receive signals from satellites of the positioning system and derive from these position information which they convert into correction data and transmit by means of a radio transmitter to the vehicle which is equipped with a suitable receiver for the reception of the correction data. Using the correction data and the signals received from the satellites, the position of the vehicle is determined by a computer. On the one hand, so-called wide area systems having stationary reference stations with a relatively high transmitting power and, on the other hand, local reference stations are known which are mobile and, as a rule, are sited in the vicinity of the field to be processed in each case or are permanently mounted at elevated locations. An advantage of positioning by means of a local reference station compared with a wide area system lies in a much higher accuracy which is achieved because there are no network propagation times and the correction signal is generated in the immediate environment of the operating site.

A further possibility for improving the accuracy of the positioning consists in detecting signals of the satellites of the positioning system at different frequencies. Since atmospheric influences affect the receiving times due to their frequency-dependent dielectric constant, these influences can be compensated for by more elaborate multi-frequency receivers.

SUMMARY

An arrangement for detecting the position of a handset comprises a vehicle having a positioning signal receiver for receiving signals of the satellites of a positioning system and an electronic processor which, in operation, generates by means of signals received by the positioning signal receiver of the vehicle a local correction signal by means of which the accuracy of a position determined by means of the signals of a positioning signal receiver can be improved. A portable handset is equipped with a positioning signal receiver for receiving signals of the satellites of the positioning system and an electronic processor which, in operation, receives position signals from the positioning signal receiver of the handset, derives from these raw position data of the handset and uses these raw position data for determining the position of the handset. The raw position data of the handset are corrected by means of the local correction signal provided by the processor of the vehicle.

DETAILED DESCRIPTION OF THE PREFERRED EMBODIMENT(S)

Figure 1:
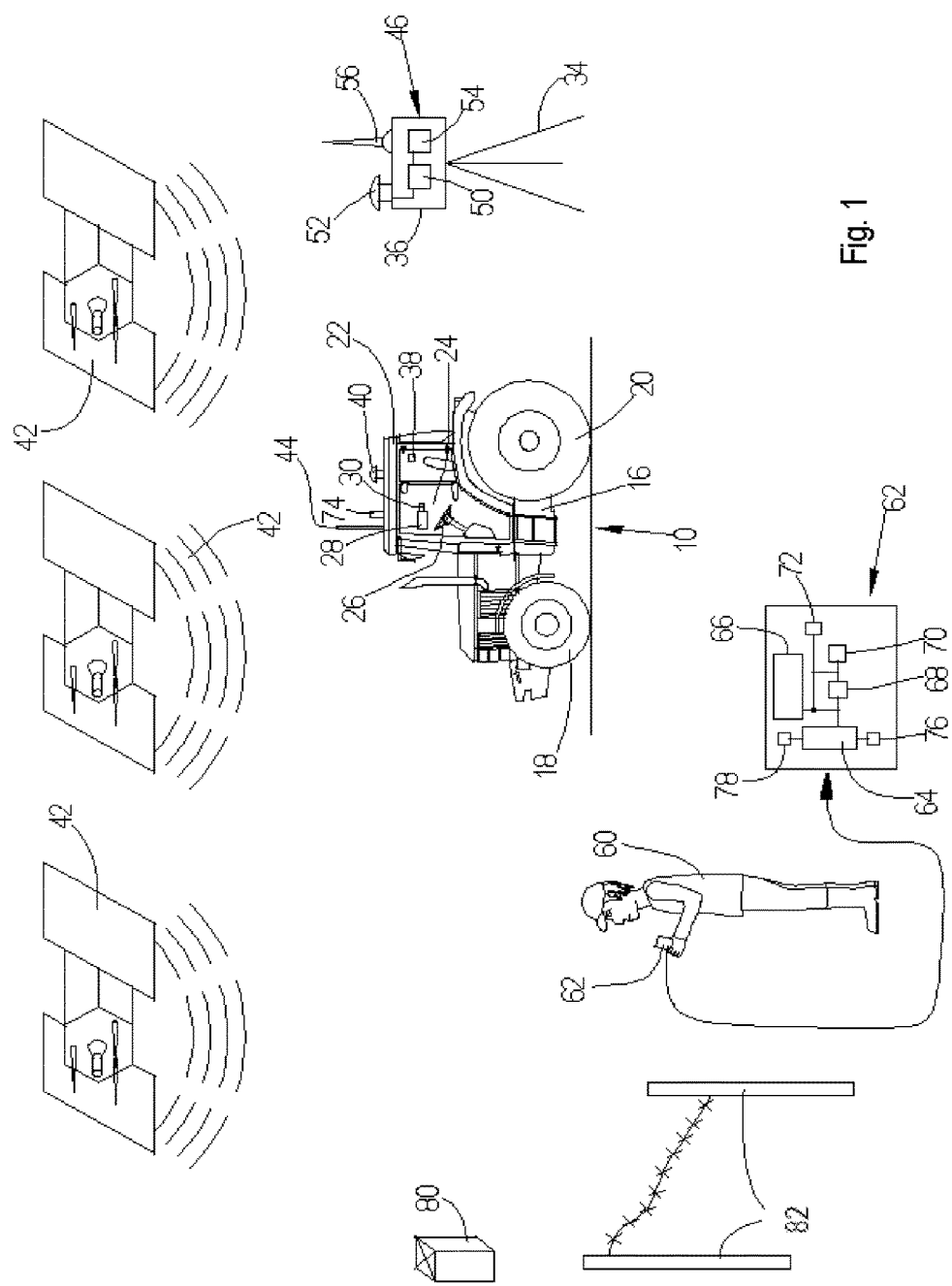
FIG. 1 shows a diagrammatic view of a mobile reference station, of an agricultural vehicle and of a handset during the surveying of the boundaries of a field.

In accordance with one embodiment, an arrangement for detecting the position of a handset comprises a vehicle having a positioning signal receiver for receiving signals of the satellites of a positioning system and an electronic processor which, in operation, generates by means of signals received by the positioning signal receiver of the vehicle a local correction signal by means of which the accuracy of a position determined by means of the signals of a positioning signal receiver can be improved. A portable handset is equipped with a positioning signal receiver for receiving signals of the satellites of the positioning system and an electronic processor which, in operation, receives position signals from the positioning signal receiver of the handset, derives from these raw position data of the handset and uses these raw position data for determining the position of the handset. The raw position data of the handset are corrected by means of the local correction signal provided by the processor of the vehicle.

In other words, the local correction signal of the electronic processor of the vehicle is also used for correcting the raw position data of the handset. By this means, its accuracy can be significantly improved.

The electronic processor of the vehicle can generate the local correction signal by means of signals, received at a number of different frequencies, from satellites of the positioning system (or a number of different positioning systems) and/or by means of signals from geostationary satellites and/or by means of correction data transmitted by radio waves from stationary and/or mobile reference stations and/or by means of correction data received by Internet or a mobile radio link. For this purpose, reference is made, for example, to the disclosure of WIPO patent application WO 2011/106278 A2.

The raw position data of the handset can be corrected by the electronic processor of the handset or the electronic processor of the vehicle. In the first-mentioned embodiment, the electronic processor of the handset is thus connected in a wireless signal-transmitting manner to the electronic processor of the vehicle and receives the local correction signals of the electronic processor of the vehicle and corrects the raw position data of the handset by means of these correction signals. In the second embodiment mentioned, in contrast, the electronic processor of the handset is connected in a wireless signal-transmitting manner to the electronic processor of the vehicle and transmits the raw position data of the handset to the electronic processor of the vehicle which corrects the raw position data of the handset by means of its local correction signals.

If the handset is used for mapping points on the field, the employee can thus drive onto the field with the agricultural vehicle and in succession go to the positions to be mapped with the handset. The raw position data of the handset are detected, corrected by means of the local correction signal of the vehicle and mapped. In this manner, the mapping takes place with a higher precision than previously. The mapping is done preferably in such a manner that the handset is brought to the point to be mapped and the position of the handset now assumed is mapped (preferably following a corresponding operator input). The handset can also be used for other purposes: thus, supplied with the correction signal, it could be used as accurate position receiver on a cultivation device or an automotive slave machine and, via a suitable interface, perform, for example, location-specific approaches of actuators of the cultivation device (e.g. for delivery quantities) or control the steering of the slave machine in parallel with the vehicle serving as master machine.

Furthermore, the handset can be equipped with a camera and a photo of the position to be mapped can be stored. The photo can be used later for planning further measures, e.g. repairing a defective drainage or removing a stone from the field. To facilitate the recovery of the position at which the photo has been taken, the handset can be provided with an inclination sensor for detecting the orientation of the handset in space and the data of the inclination sensor can be stored with the photo and the position data. The inclination sensor can comprise in a manner known per se an inertial sensor and/or a compass.

The possibility also exists that the electronic processor of the handset identifies a point in the photo by means of an image processing program and calculates its position by means of the data of the inclination sensor and of the position signals from the positioning signal receiver. In this context, signals from the optics of the camera can also be utilized which enable the distance between the handset and the recorded object to be determined, e.g. focal lengths and autofocus distance setting values. Thus, the possibility is created of also mapping points in a field which are difficult to access. In another embodiment, the handset is held as accurately as possible over the point and the horizontal alignment is corrected by means of an inbuilt mechanical or electronic plumb line. If the point is then located as accurately as possible at a specified position of the display device of the handset, a corresponding input is made into the handset and the point is mapped.

The electronic processor of the vehicle can be used for obtaining (corrected or uncorrected) position data from the handset brought to a known position of the field and to use these, (if necessary after correction by means of the local correction signal) for referencing the position signals from the positioning signal receiver. The known position can be, for example, a boundary stone. By referencing the position data of the electronic processor of the vehicle to the known position, influences worsening the accuracy of position as can be caused by tectonic displacements, lacking long-term stability or change of correction services can be compensated. Maps stored in a memory of the electronic processor of the vehicle, e.g. for variable delivery rates, can be read out in this manner referenced to the known point and with accurate position.

The possibility also exists to carry out the tectonic corrections mentioned in other ways, e.g. by downloading corresponding data for the tectonic displacement from suitable Internet pages.

The position data of the handset can be obtained by detecting a position at a first position which is not affected by shading, e.g. by trees, by means of the position signals from the positioning signal receiver and by detecting the position at a second position which is affected by shading. The differences in position between the first and second position are detected by means of an inertial sensor of the handset. They can be acquired alternatively or additionally by measuring the propagation time of a signal between the vehicle and the handset or conversely. The possibility also exists of subsequently performing a further measurement at a point not affected by shading and to use this for improving the accuracy. A so-called reverse step is also possible here: points in the unshaded area are determined by means of the corrected positioning signal receiver of the handset and marked so as to be recognizable for the camera algorithms. Subsequently, a photo is made in the direction of the marked points from the point to be determined. Alignment can be determined via the integrated sensor system (inclination sensor with inertial sensor and/or compass) of the handset. The position can be determined over the points in the field via a backward step (or the focal length and distance set for the autofocus of the camera).

FIG. 1 shows a side view of an agricultural vehicle 10 in the form of a tractor. The vehicle 10 is constructed on a bearing frame 16 which is supported on steerable front wheels 18 and driveable rear wheels 20 and carries a cabin 22 in which an operator workstation 24 is located. The operator workstation 24 comprises a steering wheel 26, a seat, pedals (not shown) and a virtual terminal 28. The virtual terminal 28 is connected to a data transmission device 30 which, in the embodiment shown, is a serial data bus.

The data transmission device 30 is also connected to an electronic processor 38 which is connected directly or via the data transmission device 30 to a positioning signal receiver 40 for the reception of signals from satellites 42 of a positioning system (e.g. GPS, Glonass and/or Galileo) and a receiving unit 44 which is used for receiving correction data modulated onto radio waves, which are radiated by a mobile reference station 46 via a suitable arbitrary protocol. The reference station 46 could also be stationary or composed of a network of stationary reference stations.

The mobile reference station 46 comprises a tripod 34 on which a housing 36 is mounted which contains an electronic processor 50 which is connected to a positioning signal receiver 52 and via a transmitting and receiving unit 54 to a radio antenna 56. In operation, the mobile reference station is erected at the edge of a field or at another suitable place. The positioning signal receiver 52 provides the processor 50 with position signals which it derives from signals which it receives from the satellites 42. The processor 50 generates by means of the position signals correction data which are modulated onto radio frequencies by the transmitting and receiving unit 54 and radiated via the radio antenna 56.

An operator 60 holds a handset 62, which can be implemented in the form of a so-called smartphone or tablet computer, in his hand. The hand-held handset 62 comprises an electronic processor 64, a touch-sensitive display device 66, a positioning signal receiver 68, a first handset transmitting and receiving unit 70 and a second handset transmitting and receiving unit 72, all of which are connected to the electronic processor 64. The first transmitting and receiving unit 70 is used for receiving and transmitting signals via telecommunication links such as GSM, UMTS or LTE. The second handset transmitting and receiving unit 72 is used for transmitting and receiving signals via a short-range wireless link, e.g. via WLAN or Bluetooth and is connected to a corresponding second transmitting and receiving unit 74 of the vehicle 10.

Figure 2:
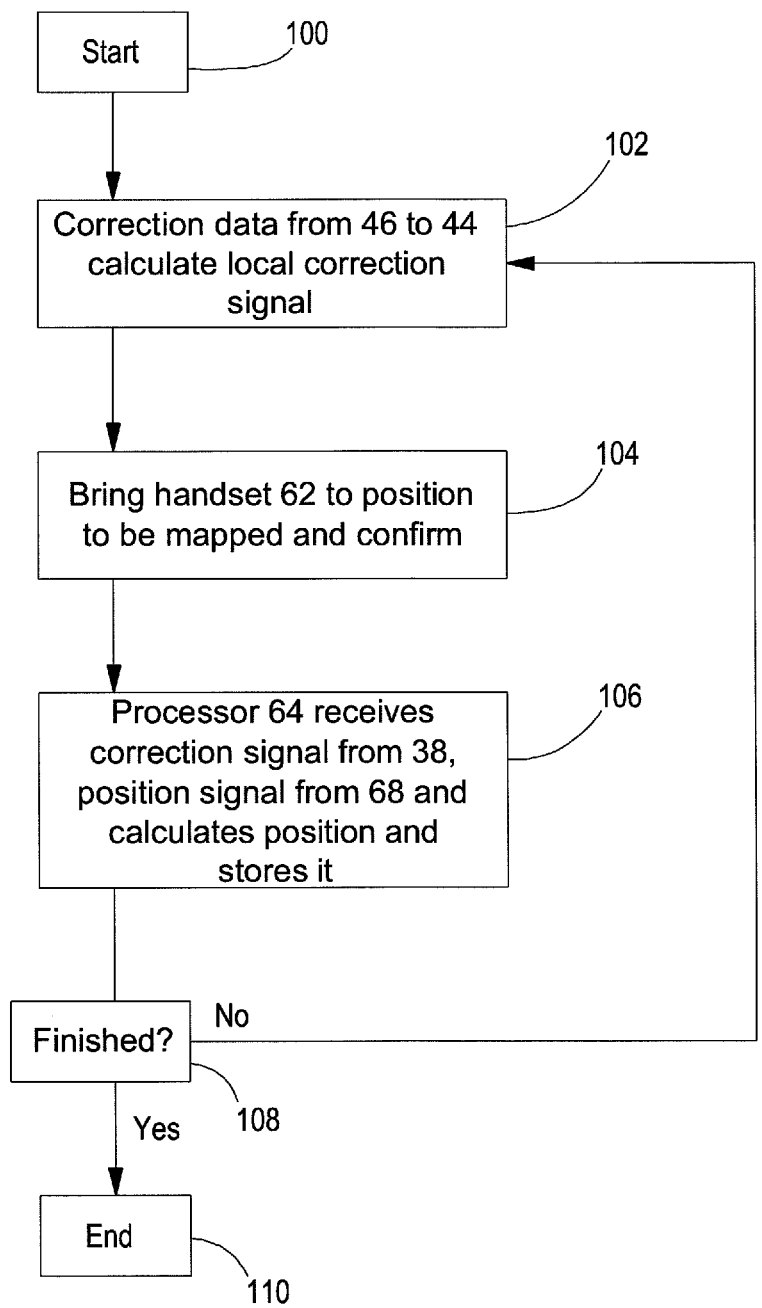
FIG. 2 shows a flowchart for a first possible procedure according to which the processors of the reference station, of the vehicle and of the handset proceed during the surveying.

In the electronic processor 64 of the handset 62, a suitable program is loaded which provides for a procedure, shown in FIG. 2, for mapping the boundaries of a field which are marked by a fence 82 in FIG. 1.

The processor 38 of the vehicle 10 receives the signals of the satellites 42 by means of the positioning signal receiver 40 at a number of frequencies and, via the receiving unit 44, the differential correction data from the mobile reference station 46 and determines by means of the signals of the satellites 42 and the correction data from the reference station, the respective accurate position of the vehicle 10 which can be used in a manner known per se for automatically steering the vehicle 10 and/or for the site-specific delivery of materials such as fertilizer or seeds. In the application shown here, the vehicle 10, however, can be standing still on the field and is moved at most if the handset 62 passes out of range of the second vehicle transmitting and receiving unit 74.

After the start in step 100, correction data are transmitted from the mobile reference station 46 to the receiving unit 44 of the vehicle 10 in step 102 and the processor 38 of the vehicle 10 calculates the position of the vehicle 10 by means of the differential correction data and the signals, received at several different frequencies, of the satellites 42 (one or several different positioning systems such as GPS, Glonass and/or Galileo) in order to compensate for tropologically, ionospherically or atmospherically related differences in propagation time, multi-path reception, shadings and other disturbances. For this purpose, reference is made, for example, to the disclosure of WIPO patent application WO 2011/106278 A2. In addition, a local correction signal is calculated for the handset 62 in step 102 by means of the position of the vehicle 10 just determined and the received differential correction data. This makes use of the fact that the position of the vehicle 10 and the corrections to be applied there are known to the processor 38 by means of the received signals. These known corrections will be used subsequently as local correction signals.

In step 104, the operator 60 points the handset 62 to a position to be mapped. In the embodiment shown in FIG. 1, he can place it, for example, on a post of the fence 82. Following this, the operator 60 can make an input to the processor 64 via the touch-sensitive display device 66 in order to confirm that the handset 62 is now located at a position to be mapped.

Step 106 follows in which the processor 64 of the handset 62 receives via the second handset transmitting and receiving unit 72 and the second vehicle transmitting and receiving unit 74 the local correction signals from the processor 38 of the vehicle 10 which are as current as possible. The processor 64 receives position signals from the positioning signal receiver 68 and initially calculates uncorrected raw position data into which the correction signals do not yet flow. By means of the raw position data and the local correction signals, the processor 64 then determines the current position of the handset 62 which corresponds to the position to be mapped and stores it in a memory of the handset 62.

Step 108 follows in which the operator inputs via the touch-sensitive display device 66 whether he has terminated the mapping process. If this is so, the end of data recording follows with step 110, otherwise step 102 follows again. The data with regard to the boundary of the field, stored in the handset 62, can be transmitted via the second handset transmitting and receiving unit 72 and the second vehicle transmitting and receiving unit 74 to the processor 38 of the vehicle 10 or they are loaded later wirelessly or via a memory card to a yard computer (not shown). The handset 62 could thus also be used for farm management by using the wireless transmission capability of the handset 62 (i.e. of the second handset transmitting and receiving unit 72) for transmitting information to other machines and/or servers. The highly accurate detected positions of the handset 62 can be utilized for improving farm management.

Figure 3:
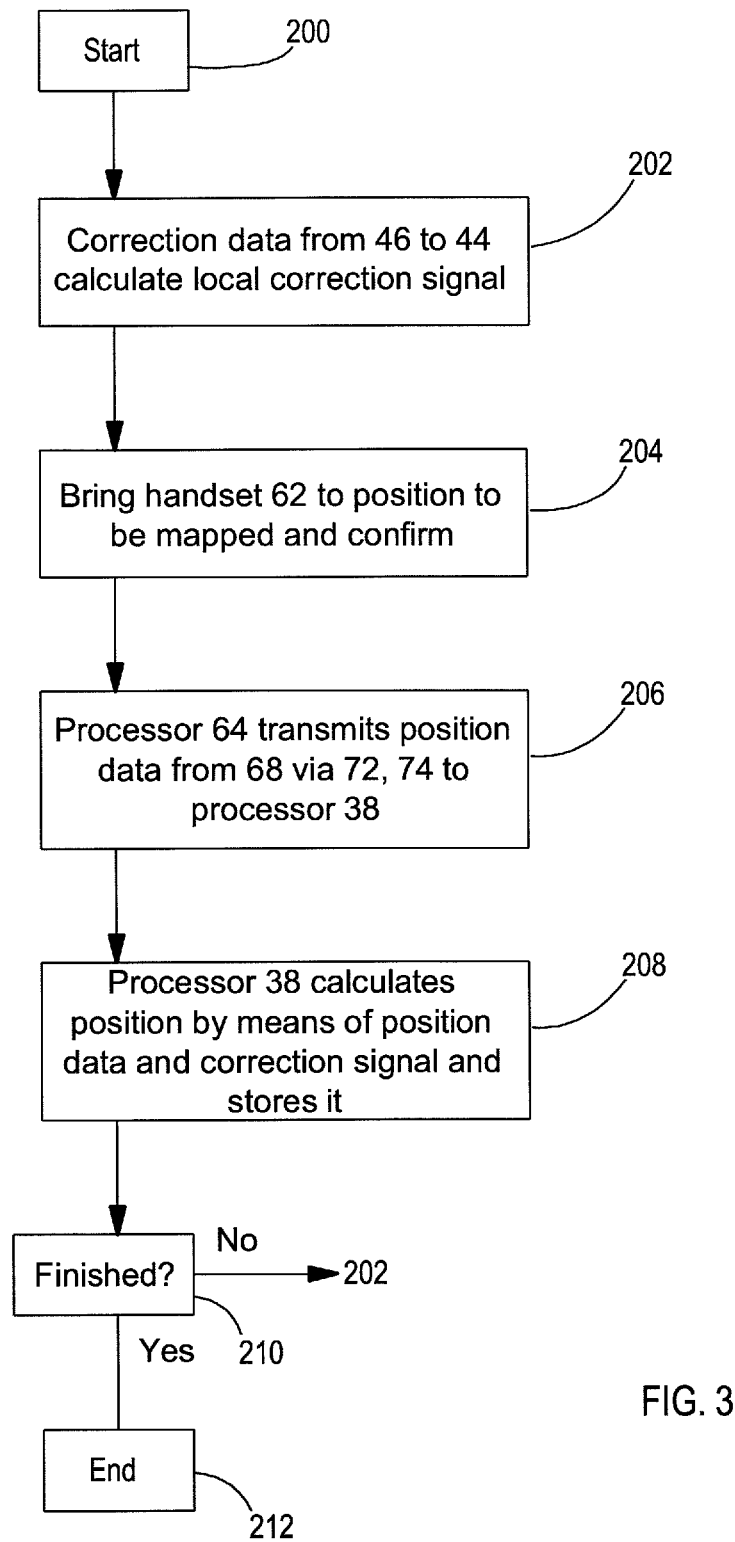
FIG. 3 shows a flowchart for a second possible procedure according to which the processors of the reference station, of the vehicle and of the handset proceed during the surveying.

FIG. 3 shows another, possible procedure in mapping the field. After the start in step 200, correction data are transmitted in step 202 from the mobile reference station 46 to the receiving unit 44 of the vehicle 10 and the processor 38 of the vehicle 10 calculates the local correction signals by means of the differential correction data and the signals, received at several different frequencies, of the satellites 42 in order to compensate for the abovementioned disturbances. In step 204, the operator 60 moves the handset 62 to a position to be mapped. In the embodiment according to FIG. 1, he can place it, for example, on a post of the fence 82. Subsequently, the operator 60 can make an input to the processor 64 via the touch-sensitive display device 66 in order to confirm that the handset 62 is now located at a position to be mapped. Step 106 follows in which the processor 64 of the handset 62 derives from the received position signals of the positioning signal receiver 65 raw position data and then transmits these to the processor 38 of the vehicle 10 via the second handset transmitting and receiving unit 72 and the second vehicle transmitting and receiving unit 74. In step 208, the processor 38 of the vehicle 10 then calculates by means of the local correction signals from step 202 and by means of the received raw position data of the positioning signal receiver 68 the current position of the handset 62 which corresponds to the position to be mapped, and stores these in a memory. Step 210 follows in which the operator inputs via the touch-sensitive display device 66 whether he has ended the mapping process. If this is so, the end of data recording follows with step 212 and otherwise, step 202 follows again. The data stored via the processor 38 of the vehicle 10 with regard to the boundary of the field will be loaded later wirelessly or via a memory card to a yard computer (not shown).

It should be noted that various modifications and additions to the present invention are conceivable. Thus, the handset 62 can be equipped with a camera 76 and an inclination sensor which detects the inclination of the handset 62 in space (i.e. along its three axes). The camera 76 can be used for creating a photo of an object to be mapped, e.g. of a post of the fence 82 in FIG. 1. In steps 104 and 204, the handset 62 does therefore not need to be placed on the post which is possibly difficult to reach if it is located, e.g., on the other side of a trench. On the processor 64 of the handset 62, an image processing software runs which recognizes the object by means of the photo and detects by means of the data of the objective (focal length, set distance of the autofocus of the objective) and the position signals of the positioning signal receiver 68 and of the inclination sensor 78, the accurate spatial position of the object. This detected position is then used in steps 106 and 206. The photo can also be recorded and stored in order to document shortcomings and to plan further measures.

Furthermore, the handset 62 can be brought to a reference point on the field, e.g. placed on a boundary stone 80. The position of the handset 62 is detected there following a corresponding input of the operator, analogously to steps 106 and 206, and transmitted to the processor 38 of the vehicle 10, wherein the local correction signals can be used for improving the accuracy on the side of the handset 62 (as in FIG. 2) or on the side of the processor 38 of the vehicle 10 (as in FIG. 3). Lastly, the processor 38 of the vehicle 10 has information on the accurate position of the reference point, now detected, which is utilized for referencing (correction by displacement) a position of the reference point mapped in a memory of the processor 38. In this manner, uncertainties which have occurred since a last surveying of the field can be compensated for, such as tectonic displacements or changes in the correction signal which can be based, e.g., on any change of provider of the correction system or on a reference station 34 directed at a different location than that of the previous data recording, or on lacking long-term stability of the correction system.

Finally, situations are conceivable in which the positioning signal receiver 68 does not operate correctly due to shading. Such situations are possible, for example, when there are tall trees at the edge of the field. In the case of such situations, the possibility exists of firstly detecting the position of the handset 62 at an unshaded position of the field as in steps 104 and 106 of FIGS. 2 and 204 to 208 of FIG. 3. This first position is thus stored by the processor 64 of the handset 62 or the processor 38 of the vehicle 10. Subsequently, the handset 62 is brought to the second position to be mapped. The changes in position occurring during this process are detected by inertial sensors of the inclination sensors 78. Finally, the precise second positions to be surveyed are evaluated by means of the first position and the position changes. As final control, a third point can be determined again outside the shading area with the aid of the positioning signal receiver 68 and the local corrections. Deviations in position occurring in the inertial measurement for the third point can be compensated for in order to be applied proportionally as improvements at the second point.

In another embodiment, the distance between the second handset transmitting and receiving unit 72 and the second vehicle transmitting and receiving unit 74 and the first and second positions is determined on a propagation time base and by means of the measured distances the second positions are evaluated, the camera being usable for producing a picture of the first position at the second position which is used for accurately determining the second position. In this context, signals received by the positioning signal receivers 40 and 68 from the satellites 42 can be used as synchronization signals. Furthermore, the inertial sensor system and/or the compass can be used for determining the camera orientation or several points are determined outside the shading area. In the second case, the orientation is performed via a backward step.

The invention claimed is:

1. An arrangement for detecting a position of a handset the arrangement comprising:
   a vehicle having a vehicle positioning signal receiver for receiving signals of a plurality of satellites of a positioning system and a vehicle electronic processor, the vehicle electronic processor configured for generating a local correction signal from satellite signals received by the vehicle positioning signal receiver of the vehicle and by received differential correction data from a stationary or mobile reference station the local correction signal providing an accuracy improvement of a position determined by the signals of the vehicle positioning signal receiver;
   a portable handset in a field, the portable handset comprising a handset positioning signal receiver for receiving signals of the satellites of the positioning system and a handset electronic processor, the handset electronic processor configured for receiving signals from the handset positioning signal receiver and deriving from these raw position data of the handset, wherein the raw position data of the handset are correctable by the vehicle electronic processor using the local correction signal provided by the vehicle electronic processor and the raw position data of the portable handset, wherein the local correction signal is determined based on a position of the vehicle and the received differential correction data, and wherein the raw position data of the handset is correlated to a reference position of an object located in the field that is associated with an operational task of the vehicle.

2. The arrangement according to claim 1, wherein the vehicle electronic processor can be configured to generate the local correction signal from signals, received at a number of frequencies, from satellites of the positioning system or from signals from geostationary satellites or from correction data transmitted by radio waves from stationary or mobile reference stations or from correction data received by Internet.

3. The arrangement according to claim 1, wherein the handset electronic processor is connected via a wireless signal to the vehicle electronic processor and can be configured or operated to receive the local correction signal from the vehicle electronic processor and to correct the raw position data of the handset using the local correction signal.

4. The arrangement according to claim 1, wherein the handset electronic processor is connected via a wireless signal to the vehicle electronic processor and can be configured for transmitting the raw position data of the handset to the vehicle electronic processor and the vehicle electronic processor can be configured to correct the raw position data of the handset using the local correction signal.

5. The arrangement according to claim 1, wherein the handset can be brought to a point to be mapped and the local position of the handset is mapped and is used for the automatic steering of a vehicle or for the automatic, location-specific driving of actuators.

6. The arrangement according to claim 1, wherein the handset is equipped with a camera and a photo of a position to be mapped can be stored.

7. The arrangement according to claim 6, wherein the handset is provided with an inclination sensor or a compass for detecting the orientation of the handset in space and the data of the inclination sensor can be stored with the photo and the position data.

8. The arrangement according to claim 7, wherein the handset electronic processor can be configured to operate to identify a point in a photo and calculate its position using the data of the inclination sensor, a compass, or combinations thereof, or by using a focal length of the camera or an auto-focus set distance of the camera and the position signals of the handset positioning signal receiver.

9. The arrangement according to claim 1, wherein the vehicle electronic processor can be configured for obtaining position data from the handset brought to a known position of the field and using it for referencing the position signals on the vehicle positioning signal receiver.

10. The arrangement according to claim 1, wherein the position data of the handset can be obtained by detecting the position at a first position which is not affected by shading, using by moans of the position signals from the handset positioning signal receiver and by detecting the position at a second position which is affected by shading, wherein the differences in position between the first and second position can be detected by means-of an inertial sensor or compass of the handset and/or or by propagation time measurement of a signal from the vehicle to the handset or conversely, by using a picture recorded by a camera of the handset.

11. A method for detecting a position of a handset comprising:
receiving signals of a plurality of satellites of a positioning system by a vehicle positioning signal receiver and generating a local correction signal from satellite signals received by the vehicle positioning signal receiver of the vehicle and by received differential correction data from a stationary or mobile reference station using a vehicle electronic processor, the local correction signal providing an accuracy improvement of a position determined by the vehicle positioning signal receiver;
receiving signals of the satellites of the positioning system by a handset positioning signal receiver arranged in a portable handset in a field, transmitting the position signals of the handset positioning signal receiver to a handset electronic processor and using the position signals for deriving raw position data of the handset for determining the position of the portable handset;
receiving the local correction signal from the vehicle electronic processor by the handset positioning receiver and transmitting the local correction signal to the handset electronic processor; and
determining the position of the portable handset based on the raw position of the portable handset and the local correction signal, wherein the raw position data of the handset are corrected using the local correction signal provided by the vehicle electronic processor, and wherein the raw position data of the handset is correlated to a reference position of an object located in the field that is associated with an operational task of the vehicle.

* * * * *